US012403496B2

(12) United States Patent
Chen et al.

(10) Patent No.: US 12,403,496 B2
(45) Date of Patent: Sep. 2, 2025

(54) CO-AXIAL ROLLER PRINTING EQUIPMENT AND METHOD THEREOF

(71) Applicant: National Taiwan Normal University, Taipei (TW)

(72) Inventors: Shun-Tong Chen, Taipei (TW); Chien-Ta Huang, Taipei (TW)

(73) Assignee: National Taiwan Normal University, Taipei (TW)

( * ) Notice: Subject to any disclaimer, the term of this patent is extended or adjusted under 35 U.S.C. 154(b) by 455 days.

(21) Appl. No.: 17/688,657

(22) Filed: Mar. 7, 2022

(65) Prior Publication Data

US 2022/0314268 A1 Oct. 6, 2022

(30) Foreign Application Priority Data

Apr. 1, 2021 (TW) ................................ 110112077

(51) Int. Cl.

*B05C 1/02* (2006.01)
*B05C 1/08* (2006.01)
*B05D 1/28* (2006.01)

(52) U.S. Cl.

CPC .............. *B05C 1/02* (2013.01); *B05C 1/0808* (2013.01); *B05D 1/28* (2013.01); *B05C 1/0817* (2013.01)

(58) Field of Classification Search

CPC .................................................. B05C 1/08–12
See application file for complete search history.

(56) References Cited

U.S. PATENT DOCUMENTS

| | | | | | |
|---|---|---|---|---|---|
| 4,949,667 | A * | 8/1990 | Yoshida | B05C 1/0865 118/224 |
| 6,645,297 | B1 * | 11/2003 | Suzuki | H05K 3/0091 118/224 |
| 2003/0121470 | A1 * | 7/2003 | Okeshi | B05C 1/0808 118/244 |
| 2020/0147638 | A1 | 5/2020 | Buck, Jr. et al. | |

FOREIGN PATENT DOCUMENTS

| | | | |
|---|---|---|---|
| CN | 1308993 | A | 8/2001 |
| EP | 0559465 | A1 | 9/1993 |
| TW | 201630685 | A | 9/2016 |
| TW | 201938277 | A | 10/2019 |

* cited by examiner

*Primary Examiner* — Dah-Wei D. Yuan
*Assistant Examiner* — Stephen A Kitt

(57) ABSTRACT

A co-axial roller printing equipment includes a working platform, a roller, a grinding device, a cutting device and a coating structure. The working platform is configured for carrying a substrate and driving the substrate to move. The roller is disposed above the working platform and has a surface. The grinding device is disposed on the working platform and configured to contact and grind the surface of the roller. The cutting device is disposed on the working platform and configured to cut the surface of the roller to form a plurality of relief structure. The coating structure is configured to receive a slurry and coat the slurry on the relief structures. Wherein, the grinding device and the cutting device grind and cut the surface of the roller in sequence; wherein, the coating structure coats the slurry on the relief structures, then the roller prints the slurry on the substrate.

7 Claims, 10 Drawing Sheets

CO-AXIAL ROLLER PRINTING EQUIPMENT AND METHOD THEREOF

BACKGROUND OF THE INVENTION

1. Field of the Invention

The present invention relates to a roller printing equipment, especially to a co-axial roller printing device which does not need to disassemble the roller and can improve the printing precision.

2. Description of the Prior Art

With the vigorous development of the 3C industry and the trend of miniaturization, smart devices (such as mobile phones, tablets and wearable devices) have become ubiquitous, resulting in a huge increase in the demand for touch panels. The transparent conductive film material currently used in the touch panel is Indium Tin Oxide (ITO). Because the ITO film is a brittle material and cannot be bent, the application of the ITO film to flexible touch panels will be greatly restricted. In order to solve the requirements of mechanical bending, high ductility, high penetration and high conductivity, silver nanowires are good alternative materials. Among the equipment for manufacturing silver nanowires, the roller printing equipment is one of the common production equipment.

In the silver nanowire manufacturing process, the roller of the roller printing equipment needs to be processed into the required pattern and size for the silver nanowire. Next, after the feeding device of the roller printing equipment coats the slurry on the roller, the roller coats the slurry onto the substrate. However, when the surface of the roller is processed, the user needs to disassemble the roller from the roller printing equipment first, and then the user installs the processed roller back into the roller printing equipment. At this time, the axis of the roller may be eccentric due to manual installation errors, thereby reducing the coaxiality of the roller. Therefore, the silver nanowires printed by the roller printing equipment may be skewed, thereby increasing the installation times, reducing the printing efficiency and the uniformity of the silver nanowires. In addition, when the user installs the processed roller back into the roller printing equipment, the roller may also vibrate due to inaccurate manual installation, resulting in uneven size of the silver nanowires, thereby reducing the printing efficiency.

Thus, it is necessary to develop a new roller printing equipment to solve the problems of the prior art.

SUMMARY OF THE INVENTION

Therefore, one category of the present invention provides a co-axial roller printing equipment to solve the problems of the prior art.

According to an embodiment of the present invention, the co-axial roller printing equipment is configured for coating a slurry on the substrate. The co-axial roller printing equipment includes a working platform, a roller, a grinding device, a cutting device and a coating structure. The working platform is configured to carry the substrate and drive the substrate to move. The roller is configured above the working platform. The roller has a surface and rotates on an axis. The grinding device is disposed on the working platform and located on a first side of the roller. The grinding device is configured to contact and grind the surface of the roller. The cutting device is disposed on the working platform and located on a second side of the roller. The cutting device is configured to cut the surface of the roller to form a plurality of relief structures. The coating structure is configured above the working platform and located on a third side of the roller. The coating structure is configured to receive the slurry and coat the slurry on the relief structures. Wherein, the grinding device and the cutting device grind and cut the surface of the roller in sequence. Wherein, the coating structure coats the slurry on the relief structures, and then the roller prints the slurry on the substrate.

Wherein, the co-axial roller printing equipment further includes a scraping plate. The scraping plate is configured on a fourth side of the roller and contacting the surface of the roller. The scraping plate includes a plurality of grooves corresponding to the relief structures respectively, and the scraping plate is configured to scrape the excess slurry on the relief structures by the grooves.

Furthermore, the shape of the groove is one selected from square, rectangle, trapezoid and arc.

Wherein, the substrate has a substrate surface roughness, and the relief structures have a relief structure surface roughness. The substrate surface roughness is smaller than the relief structure surface roughness.

Wherein, the coating structure includes a plurality of holes corresponding to the relief structures, the coating structure coats the slurry on the relief structures through the holes.

Wherein, the cutting device is configured to cut the surface of the roller to form a plurality of groove structures, and the relief structure is formed between each two groove structures.

Wherein, the co-axial roller printing equipment further includes a controller and the working platform includes a shifting platform. The shifting platform is configured to carry the grinding device and the cutting device and connected to the controller. The controller is configured to control the shifting platform to drive the grinding device and the cutting device to grind and cut the surface of the roller.

Wherein, a gap is formed between the relief structures of the roller and the surface of the substrate.

Another one category of the present invention provides a co-axial roller printing method to solve the problems of the prior art.

According to an embodiment of the present invention, the co-axial roller printing method includes the following steps of: driving a roller configured above a working platform to rotate on an axis; grinding a surface of the roller by a grinding device disposed on the working platform; cutting the surface of the roller to form a plurality of relief structures by a cutting device disposed on the working platform; coating the slurry on the relief structures; and driving the substrate to move on the working platform and contact the roller to coat the slurry on the substrate.

Wherein, after the step of coating the slurry on the relief structures, the method further includes the following step of: scraping the excess slurry on the relief structures.

In summary, the co-axial roller printing equipment of the present invention can directly process the roller by the grinding device and the cutting device configured on the same working platform, so that the roller can have good coaxial accuracy without disassembly, which not only increases the printing efficiency and accuracy, but also reduces the installation times. Furthermore, the roller of the co-axial roller printing equipment of the present invention can receive the slurry without disassembly and can directly print the slurry onto the substrate, which can not only effectively reduce the vibration and eccentricity of the roller due to the disassembly in the process, but also increase the printing efficiency and consistency. Moreover, the co-axial roller printing equipment of the present invention can also use a scraping plate to scrape off the diffused and excess slurry to control the size of the metal conductive wires, thereby increasing the printing accuracy and the printing efficiency.

BRIEF DESCRIPTION OF THE APPENDED DRAWINGS

DETAILED DESCRIPTION OF THE INVENTION

Figure 1:
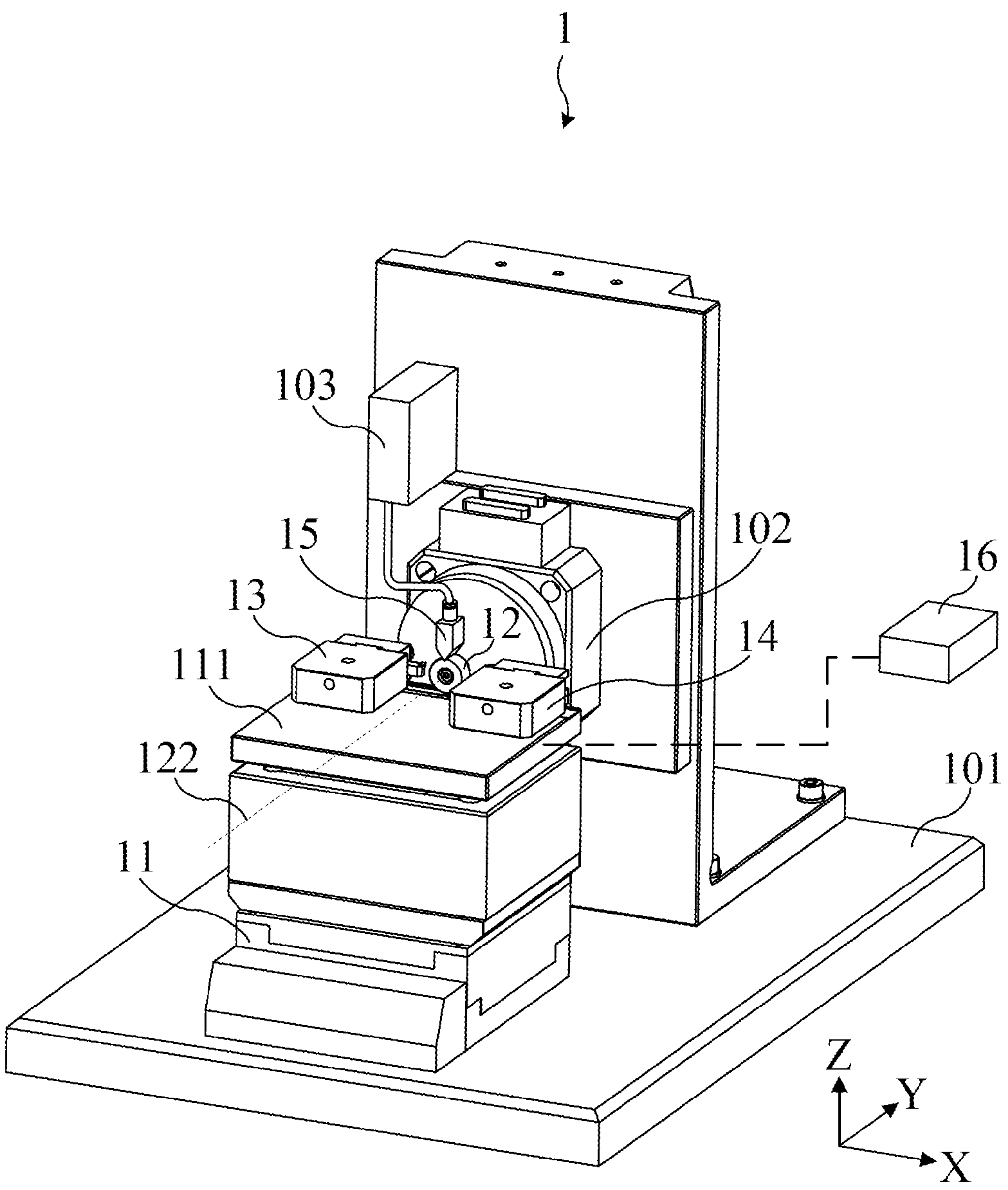
FIG. 1 is a schematic diagram illustrating a co-axial roller printing equipment in an embodiment of the present invention.

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of the present invention, it is to be understood that the orientations or positional relationships of the terms "longitudinal, lateral, upper, lower, front, rear, left, right, top, bottom, inner, outer" and the like are based on the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

Figure 2:
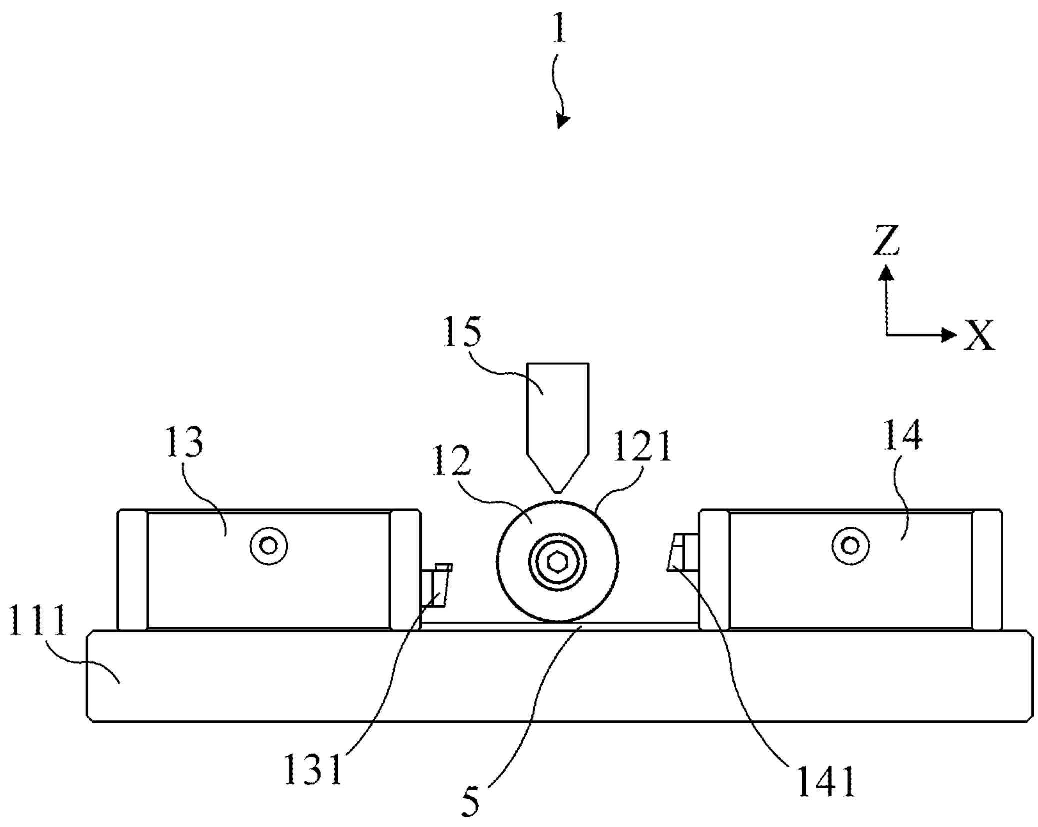
FIG. 2 is a schematic diagram illustrating the co-axial roller printing equipment of FIG. 1 in another one perspective.

Please refer to FIG. 1 and FIG. 2. FIG. 1 is a schematic diagram illustrating a co-axial roller printing equipment 1 in an embodiment of the present invention. FIG. 2 is a schematic diagram illustrating the co-axial roller printing equipment 1 of FIG. 1 in another one perspective. As shown in FIG. 1 and FIG. 2, in this embodiment, the co-axial roller printing equipment 1 includes a working platform 11, a roller 12, a grinding device 13, a cutting device 14 and a coating structure 15. The working platform 11 is configured to carry a substrate 5. The roller is configured above the working platform 11. The roller 12 has a surface 121 and rotates on an axis 122. The grinding device 13 is disposed on the working platform 11 and located on a first side of the roller 12. The grinding device 13 is configured to contact and grind the surface 121 of the roller 12. The cutting device 14 is disposed on the working platform 11 and located on a second side of the roller 12. The cutting device 14 is configured to cut the surface 121 of the roller. The coating structure 15 is configured above the working platform and located on a third side of the roller 12. The coating structure 15 is configured to receive a slurry and coat the slurry on the roller 12.

In practice, the co-axial roller printing equipment 1 of the present invention is configured for coating the slurry on the substrate 5 to form the metal conductive wires. The slurry can be but not limited to nano silver slurry, the slurry can also be slurry containing conductive material. The substrate 5 can be polyethylene terephthalate (PET) protective film, but it is not limited thereto. As shown in FIG. 1 and FIG. 2, the co-axial roller printing equipment 1 can include a base plate 101 and a rotating device 102. The working platform 11 is configured on the base plate 101. Moreover, the rotating device 102 can be configured on the base plate 101 and the roller 12 is disposed on the rotating device 102, so that the roller 12 can be suspended above the working platform 11. As shown in FIG. 1, the axis 122 of the roller 12 is parallel to Y axis and extended along the Y axis, and the roller 12 rotates on the axis 122. The substrate 5 can be configured on the working platform 11 and located between the working platform 11 and the roller 12. Furthermore, the roller 12 can contact to the substrate 5 to coat the slurry on the roller 12 onto the substrate 5.

In this embodiment, the grinding device 13 is configured on the working platform 11 and located on the left side of the roller 12. In practice, the grinding device 13 can include a grinding blade 131. The grinding blade 131 can be a monocrystalline diamond tool, and the grinding blade 131 can be a spherical blade or a toroidal blade. The material of the roller 12 can be brass or other metal material, and the roller 12 can be electroplated with a nickel-phosphorus alloy layer. When the roller 12 rotates on the axis 122, the grinding blade 131 of the grinding device 13 can contact and grind the surface 121 of the roller to increase the flatness of the surface 121 of the roller 12. It should be noted that the materials of the grinding blade 131 and the roller 12 are not limited thereto, the materials of the grinding blade 131 and the roller 12 can be determined as requirement or design.

Figure 3A:
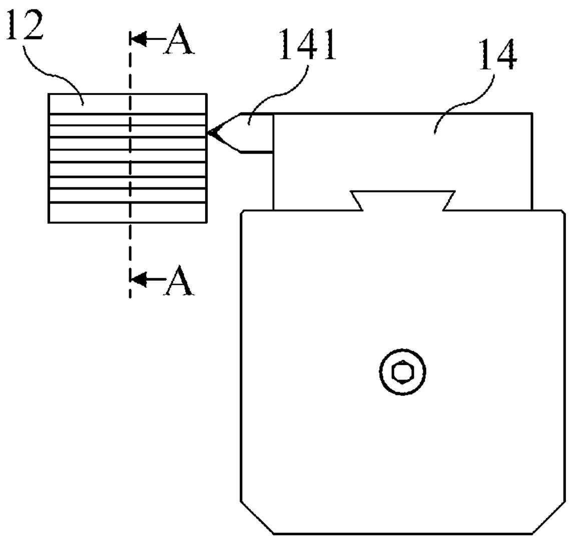
FIG. 3A is a schematic diagram illustrating the cutting device cutting the roller in FIG. 1.
Figure 3B:
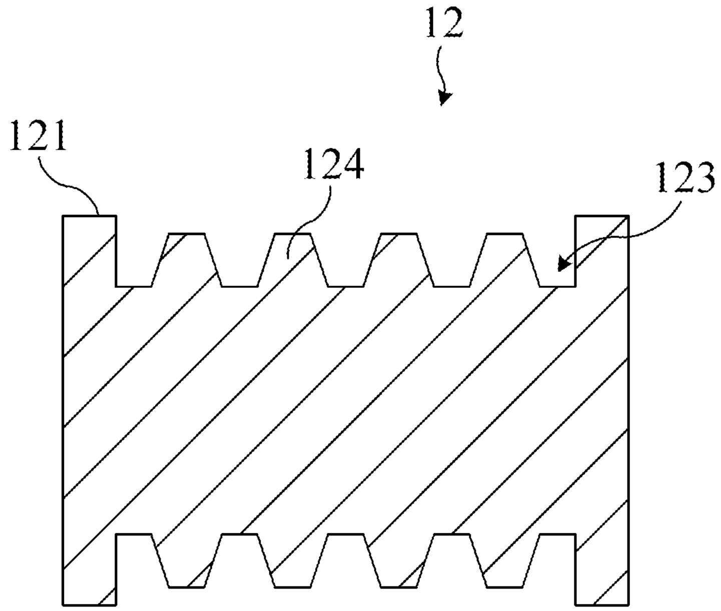
FIG. 3B is a sectional diagram illustrating the roller after cutting along the line segment A-A in FIG. 3A.

Please refer to FIG. 1, FIG. 3A and FIG. 3B. FIG. 3A is a schematic diagram illustrating the cutting device 14 cutting the roller 12 in FIG. 1. FIG. 3B is a sectional diagram illustrating the roller 12 after cutting along the line segment A-A in FIG. 3A. In this embodiment, the cutting device 14 is configured on the working platform 11 and located on the right side of the roller 12. In practice, the cutting device 14 can include a cutting blade 141, and the cutting blade 141 can be a monocrystalline diamond tool. When the roller 12 rotates on the axis 122, the cutting blade 141 of the cutting device 14 can contact and cut the surface 121 of the roller 12. As shown in FIG. 3A and FIG. 3B, in this embodiment, the cutting device 14 cuts the surface 121 of the roller 12 to form a plurality of groove structures 123. In other words, when the surface 121 of the roller 12 has the plurality of groove structures 123, a relief structure 124 is formed between each two of groove structures 123. Therefore, the surface 121 of the roller 12 has the relief structures 124 after the cutting device 14 cuts the surface 121 of the roller 12. In this embodiment, the shape of the relief structure 124 is a trapezoid, but it is not limited in practice, the shape of the relief structure can also be square, rectangle or determined as design or requirement. In addition, the number of relief structure can also be determined as design or requirement.

Figure 4A:
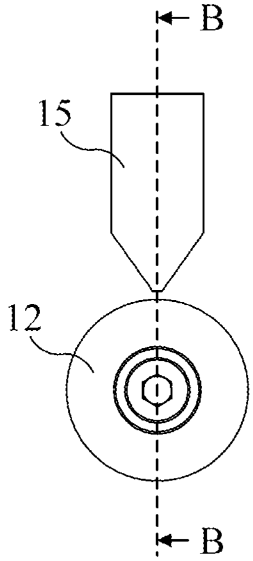
FIG. 4A is a sectional diagram illustrating the roller and the coating structure in FIG. 1.
Figure 4B:
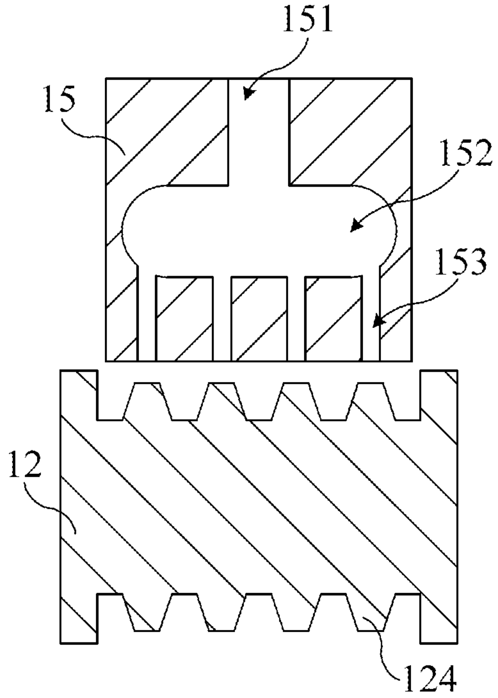
FIG. 4B is a sectional diagram illustrating the roller and the coating structure along the line segment B-B in FIG. 4A.

Please refer to FIG. 1, FIG. 4A and FIG. 4B. FIG. 4A is a sectional diagram illustrating the roller 12 and the coating 15 structure in FIG. 1. FIG. 4B is a sectional diagram illustrating the roller 12 and the coating structure 15 along the line segment B-B in FIG. 4A. As shown in FIG. 1, FIG. 4A and FIG. 4B, in this embodiment, the coating device 15 is configured above the working platform 11 and located above the roller 12. That is to say, the roller 12 is between the working platform 11 and the coating device 15. In practice, the co-axial roller printing equipment 1 can include a slurry supplier 103, and the coating device 15 includes a slurry inlet 151, a slurry containing space 152 and a plurality of holes 153. The slurry supplier 103 is configured to supply the slurry, and the slurry inlet 151 of the coating device 15 is connected to the slurry supplier 103 to receive the slurry. Moreover, the slurry inlet 151, the slurry containing space 152 and the plurality of holes 153 are communicated with each other, and the slurry containing space 152 is located between the slurry inlet 151 and the holes 153. Therefore, when the slurry inlet 151 receives the slurry, the slurry can flow into the slurry containing space 152. Moreover, the holes 153 are located at lower half of the coating structure 15 and face to the relief structures 124 of the roller 12, and the number of the hole 153 is corresponding to the number of the relief structure 124 of the roller 12. Therefore, the slurry located in the containing space 152 can flow through the holes 153 onto the relief structures 124 of the roller 12.

In this embodiment, a distance is formed between the coating structure 15 and the surface 121 of the roller 12. In practice, the distance can be the coating thickness of the slurry, but it is not limited thereto, the distance can also be greater than the coating thickness of the slurry. Since the slurry is viscous, the slurry can contact and adhere to the relief structures 124 of the roller 12 after the slurry flow through the holes 153. Furthermore, when the roller 12 rotates and the slurry supplier 103 supplies the slurry continuously, the coating structure 15 can coat the slurry onto the relief structures 124 of the roller 12.

Figure 5:
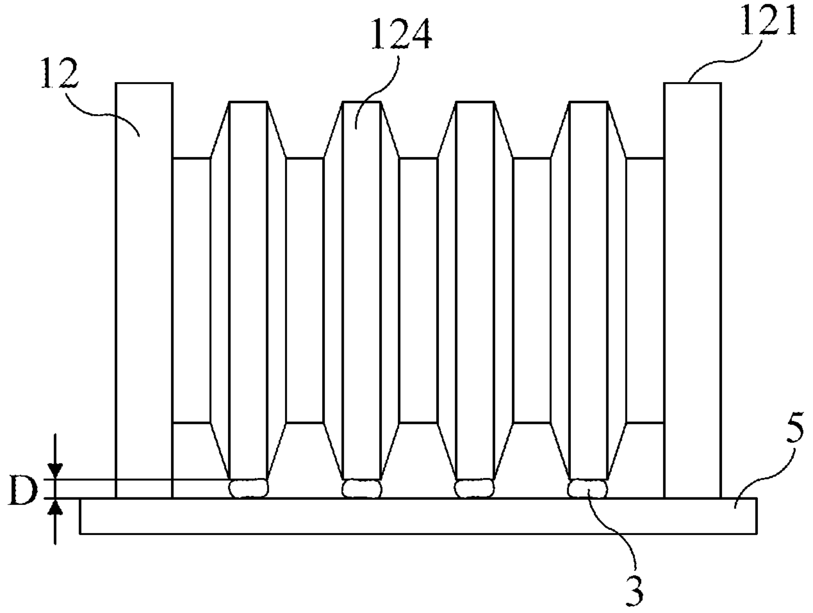
FIG. 5 is a schematic diagram illustrating the roller, the slurry and the substrate in FIG. 1.

Please refer to FIG. 5. FIG. 5 is a schematic diagram illustrating the roller 12, the slurry 3 and the substrate 5 in FIG. 1. After the coating structure located above the roller 12 coats the slurry 3 onto the relief structures 124 of the roller 12, the roller 12 can rotates and prints the slurry 3 on the relief structures 124 onto the substrate 5 located below of the roller 12. In this embodiment, a gap D is formed between the relief structure 124 of the roller 12 and the surface of the substrate 5. In practice, the gap D can be the printing thickness of the slurry 3, and the printing thickness can be smaller or equal to the coating thickness of the slurry coated onto the relief structure 124. When the roller 12 carries the slurry 3 on the relief structure 124 to the bottom of the roller 12, the slurry 3 can contact and adhere onto the substrate 5.

Moreover, in this embodiment, the substrate has a substrate surface roughness. When the grinding device grinds the surface 121 of the roller 12, the surface 121 has a roller surface roughness. Furthermore, when the cutting device cuts the surface 121 of the roller 12 to form the relief structures 124, the relief structures 124 have a relief structure surface roughness. Wherein, the substrate surface roughness is smaller than the relief structure surface roughness. In practice, when the roughness of the surface of the object is smaller, it means that the contact angle between the slurry and the surface of the object is smaller, and the adhesion of the slurry to the surface is greater. Therefore, when the slurry 3 located on the relief structures 124 of the roller contacts the substrate 5, the adhesion of the slurry 3 to the surface of the substrate 5 is greater than the adhesion of the slurry 3 to the relief structures 124, so that the slurry 3 can be printed and coated onto the substrate 5.

Please refer to FIG. 1, FIG. 2 and FIG. 6A to FIG. 6D. FIG. 6A to FIG. 6D are schematic diagram of the steps illustrating the co-axial roller printing equipment 1 coating the slurry 3 on the substrate 5 in FIG. 1. In this embodiment, the co-axial roller printing equipment 11 further includes a controller 16, and the working platform 11 further includes a shifting platform 111. The shifting platform 111 is configured to carry the grinding device 13 and cutting device 14 and connected to the controller 16. The controller 16 is configured to control the shifting platform 111 to move. In practice, as shown in FIG. 1, the controller 16 can control the shifting platform 111 to move in X axial and Y axial directions. When the controller 16 controls the shifting platform 111 to move, the controller 16 also controls the grinding device 13 and the cutting device 14 to move simultaneously.

Figure 6A:
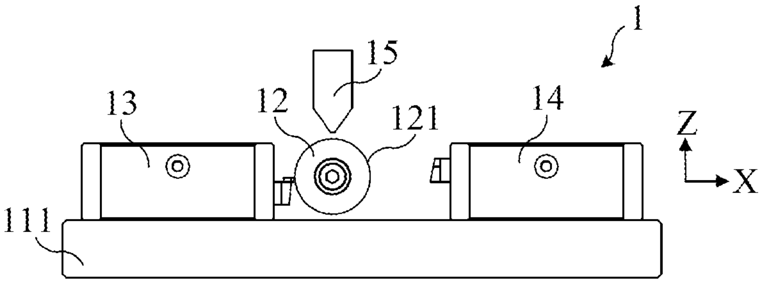
FIG. 6A to FIG. 6D are schematic diagram of the steps illustrating the co-axial roller printing equipment coating the slurry on the substrate in FIG. 1.
Figure 6B:
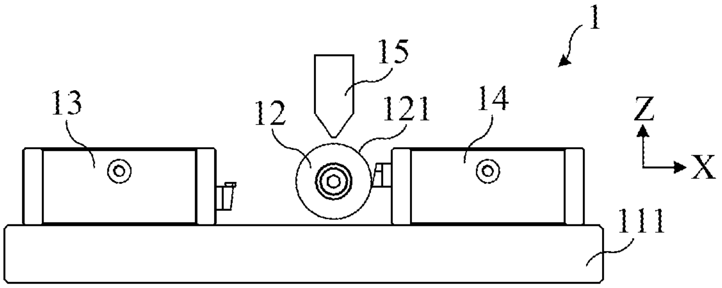

Before the co-axial roller printing equipment 1 coats the slurry 3 on the substrate 5, the rotating device 102 can drive the roller 12 to rotate. The controller 16 controls the shifting platform 111 to move toward +X axial direction first (as shown in FIG. 6A) to make the grinding device 13 configured on the shifting platform 111 to contact and grind the surface 121 of the roller 12. Then, the controller 16 controls the shifting platform 111 to move toward −X axial direction first (as shown in FIG. 6B) to make the cutting device 14 configured on the shifting platform 111 to contact and cut the surface 121 of the roller 12 to form the relief structures. In practice, the controller 16 can be a computer or a CNC controller. The controller 16 can also connect and control the rotating device 102 to drive the roller 12. The controller 16 can also control the shifting platform 111 to move toward +Y axial or −Y axial direction to make the grinding device 13 and the cutting device 14 to grind and cut the surface 121 of the roller 12 completely. Moreover, the controller 16 can be stored a grinding path and a cutting path. The controller 16 can control the shifting platform 111 to move according to the grinding path and the cutting path in sequence, so that the grinding device 13 and the cutting device 14 can grind and cut the surface 121 of the roller 12 in sequence. When the grinding device 13 and the cutting device 14 of the co-axial roller printing equipment 1 process the roller 12, the roller 12 does not need to be disassembled from the co-axial roller printing equipment 1. Therefore, the roller 12 has good coaxial accuracy, thereby increasing the printing efficiency and printing accuracy and reducing installation times.

Figure 6C:
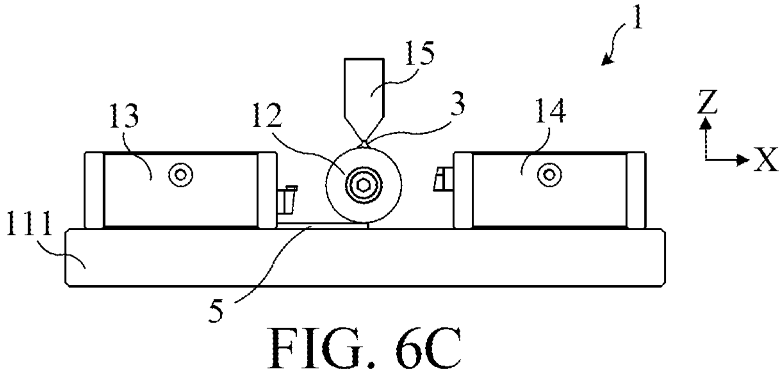
Figure 6D:
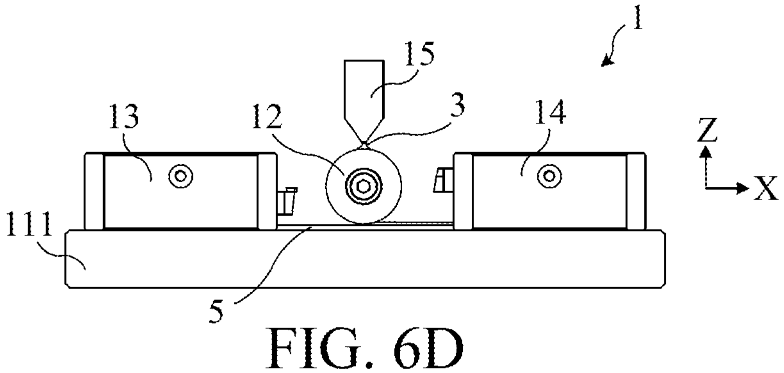

After the roller 12 generates the relief structures by grinding and cutting, the slurry supplier 103 coats the slurry 3 from above the roller 12 to the relief structures of the roller 12 through the coating structure 15 (as shown in FIG. 6C). Then, the roller 12 prints the slurry 3 on the relief structure to the substrate 5 under the roller 12 by rotating. In practice, the controller 16 can also connect and control the slurry supplier 103 to provide the slurry 3. Moreover, the working platform 11 can further include a shifting structure (not shown in figure) for contacting and driving the substrate 5 to move. In practice, the shifting structure can be a conveyor belt or a bearing. As shown in FIG. 6D, when the roller 12 rotates in the counterclockwise direction, the shifting structure can drive the substrate 5 to move in the +X axial direction, so that the slurry 3 on the relief structures can be coated on the substrate 5 to form metal conductive wires. The roller of the co-axial roller printing equipment can receive the slurry without disassembly and print the slurry onto the substrate directly. Compared with the prior art, the co-axial roller printing equipment of the present invention can effectively reduce the vibration and eccentricity of the roller due to the disassembly in the process, thereby increasing the printing efficiency and consistency.

In this embodiment, the positions of the grinding device, the cutting device and the coating structure are located on left side, right side and upper side of the roller respectively, but it is not limited in practice. The positions of the grinding device, the cutting device and the coating structure can also be located on the other positions of the roller.

Figure 7A:
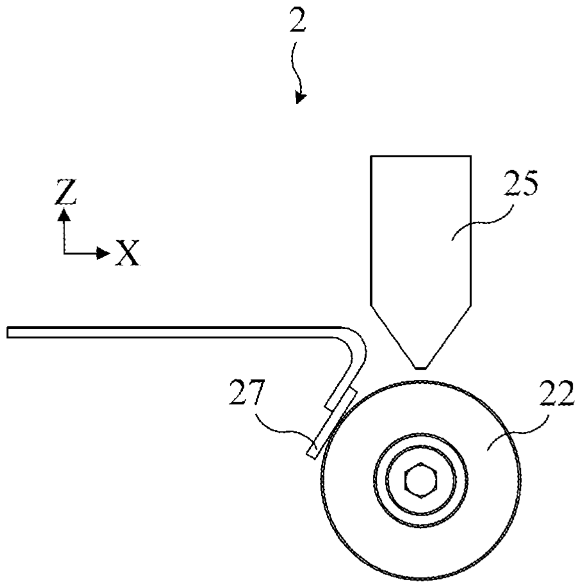
FIG. 7A is a schematic diagram illustrating the roller, coating structure and the scraping plate of the co-axial roller printing equipment in an embodiment of the present invention.
Figure 7B:
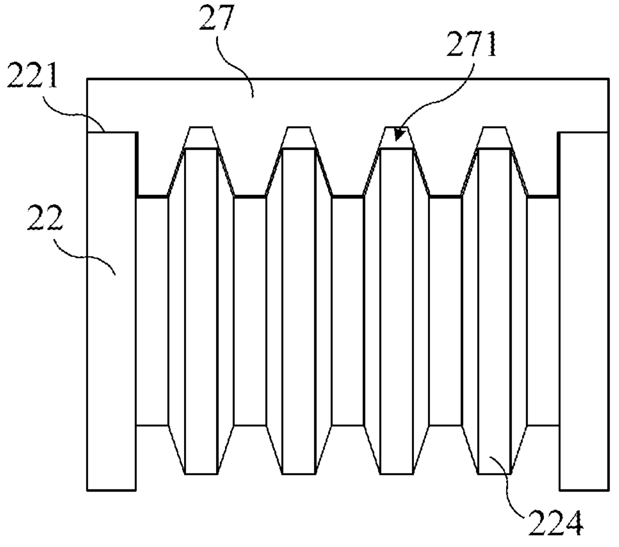
FIG. 7B is a schematic diagram illustrating the roller and the scraping plate of FIG. 7A in another one perspective.

The co-axial roller printing equipment of the present invention not only can be the type of the aforementioned embodiment, but also can be in other types. Please refer to FIG. 7A and FIG. 7B. FIG. 7A is a schematic diagram illustrating the roller 22, coating structure 25 and the scraping plate 27 of the co-axial roller printing equipment 2 in an embodiment of the present invention. FIG. 7B is a schematic diagram illustrating the roller 22 and the scraping plate 27 of FIG. 7A in another one perspective. The difference between this embodiment and the aforementioned embodiment is that the co-axial roller printing equipment 2 in this embodiment further includes a scraping plate 27. The scraping plate 27 is disposed on the fourth side of the roller 22 and contacts the surface 221 of the roller 22. As shown in FIG. 7A and FIG. 7B, when the roller 22 rotates in the counterclockwise direction, the scraping plate 27 is disposed on the upper left side of the roller 22, which is the position of the second quadrant of the X-Z axial plane. Furthermore, the scraping plate 27 includes a plurality of grooves 271 corresponding to the relief structures 224 of the roller 22 respectively. After the coating structure 25 coats the slurry on the relief structures 224 of the roller 22, the scraping plate 27 can scrape the excess slurry on the relief structures 224 by grooves 271.

Figure 7C:
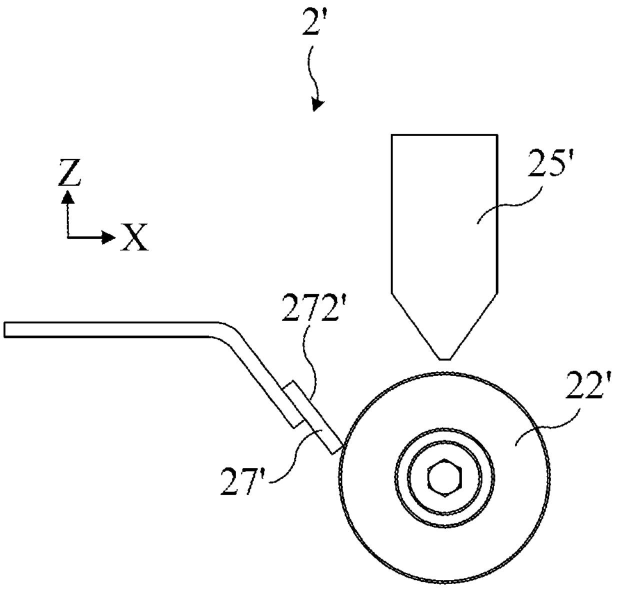
FIG. 7C is a schematic diagram illustrating the roller, coating structure and the scraping plate of the co-axial roller printing equipment in an embodiment of the present invention.
Figure 7D:
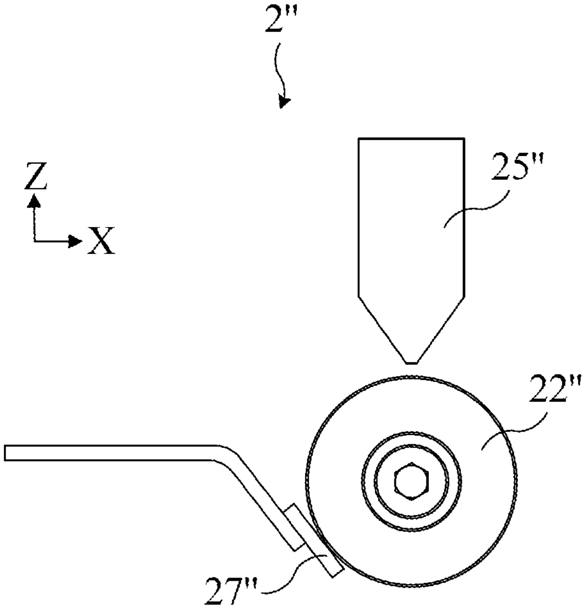
FIG. 7D is a schematic diagram illustrating the roller, coating structure and the scraping plate of the co-axial roller printing equipment in an embodiment of the present invention.

The scraping plate not only can be the type of the aforementioned embodiment, but also can be in other types. Please refer to FIG. 7C. FIG. 7C is a schematic diagram illustrating the roller 22', coating structure 25' and the scraping plate 27' of the co-axial roller printing equipment 2' in an embodiment of the present invention. As shown in FIG. 7C, the scraping plate 27' is disposed on the upper left side of the roller 22', which is the position of the second quadrant of the X-Z axial plane. Furthermore, the scraping plate 27' includes a scraping plate surface 272', and the scraping plate surface 272' is not tangent to the surface of the roller 22'. In practice, the scraping plate 27' can contact the roller 22' with an angle. When the coating structure 25' coats the slurry to the relief structures of the roller, the scraping plate 27' can scrape the excess slurry on the relief structures by grooves, so that the excess slurry can be collected on the scraping plate surface 272'. Please refer to FIG. 7D. FIG. 7D is a schematic diagram illustrating the roller 22", coating structure 25" and the scraping plate 27" of the co-axial roller printing equipment 2" in an embodiment of the present invention. As shown in FIG. 7D, in this embodiment, the scraping plate 27" is disposed on the lower left side of the roller 22", which is the position of the fourth quadrant of the X-Z axial plane. When the coating structure 25" coats the slurry to the relief structures of the roller 22", the scraping plate 27" can scrape the excess slurry on the relief structures by grooves.

In practice, the shape of the groove 271 can be square, rectangle, trapezoid or arc. Furthermore, the size of the groove 271 can be determined according to the requirement of the printing size. Moreover, the shape of the groove 271 of the scraping plate 27 can also be corresponding to the shapes of the groove structure and the relief structure of the roller 22. When the coating structure 25 coats the slurry on the relief structure 224 of the roller 22, the slurry may spread to the left and right sides due to gravity, thereby affecting the width of the metal conductive wires. Therefore, the grooves 271 of the scraping plate 27 can scrape off the diffused and excess slurry to maintain the width of the metal conductive wires, thereby increasing the printing accuracy and efficiency.

Figure 8:
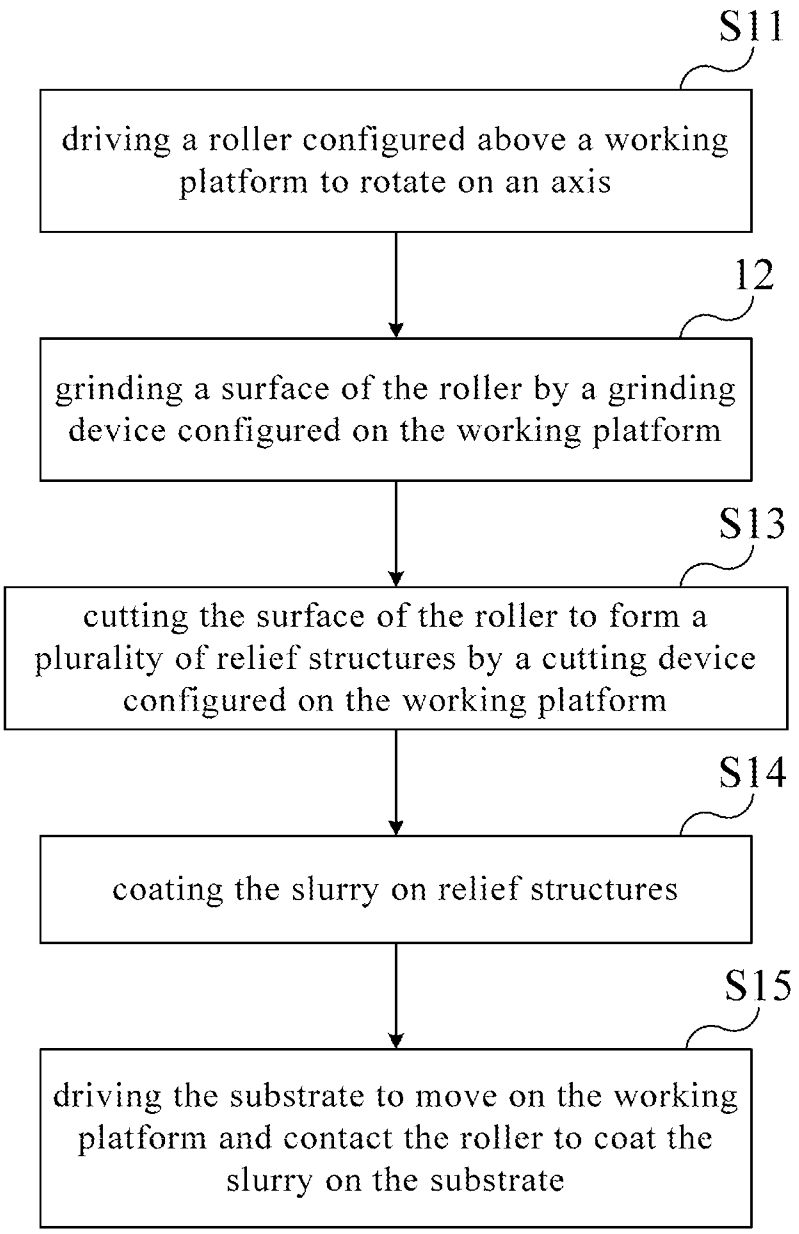
FIG. 8 is a step flow diagram illustrating a co-axial roller printing method in an embodiment of the present invention.

The present invention also provides a co-axial roller printing method to increase the printing accuracy and efficiency. Please refer to FIG. 8. FIG. 8 is a step flow diagram illustrating a co-axial roller printing method in an embodiment of the present invention. The co-axial roller printing method in FIG. 8 can be achieved by the co-axial roller printing equipment 1 in FIG. 1. As shown in FIG. 8, in this embodiment, the co-axial roller printing method includes the following steps of: step S11: driving a roller 12 configured above a working platform 11 to rotate on an axis 122: step S12: a controller 16 controls a shifting platform 111 to move to make a grinding device 13 disposed on the shifting platform 111 of the working platform 11 to grind the surface 121 of the roller 12; step S13: the controller 16 controls a shifting platform 111 to move to make a cutting device 14 disposed on the shifting platform 111 of the working platform 11 to cut the surface 121 of the roller 12 to form a plurality of relief structures 124; step S14: a slurry supplier 103 coats the slurry on the relief structures 124 by a coating structure 15; and step S15: a shifting structure of the working platform 11 drives the substrate 5 to move on the working platform 11 and contact the roller 12 to coat the slurry on the relief structures 124 onto the substrate 5.

Figure 9:
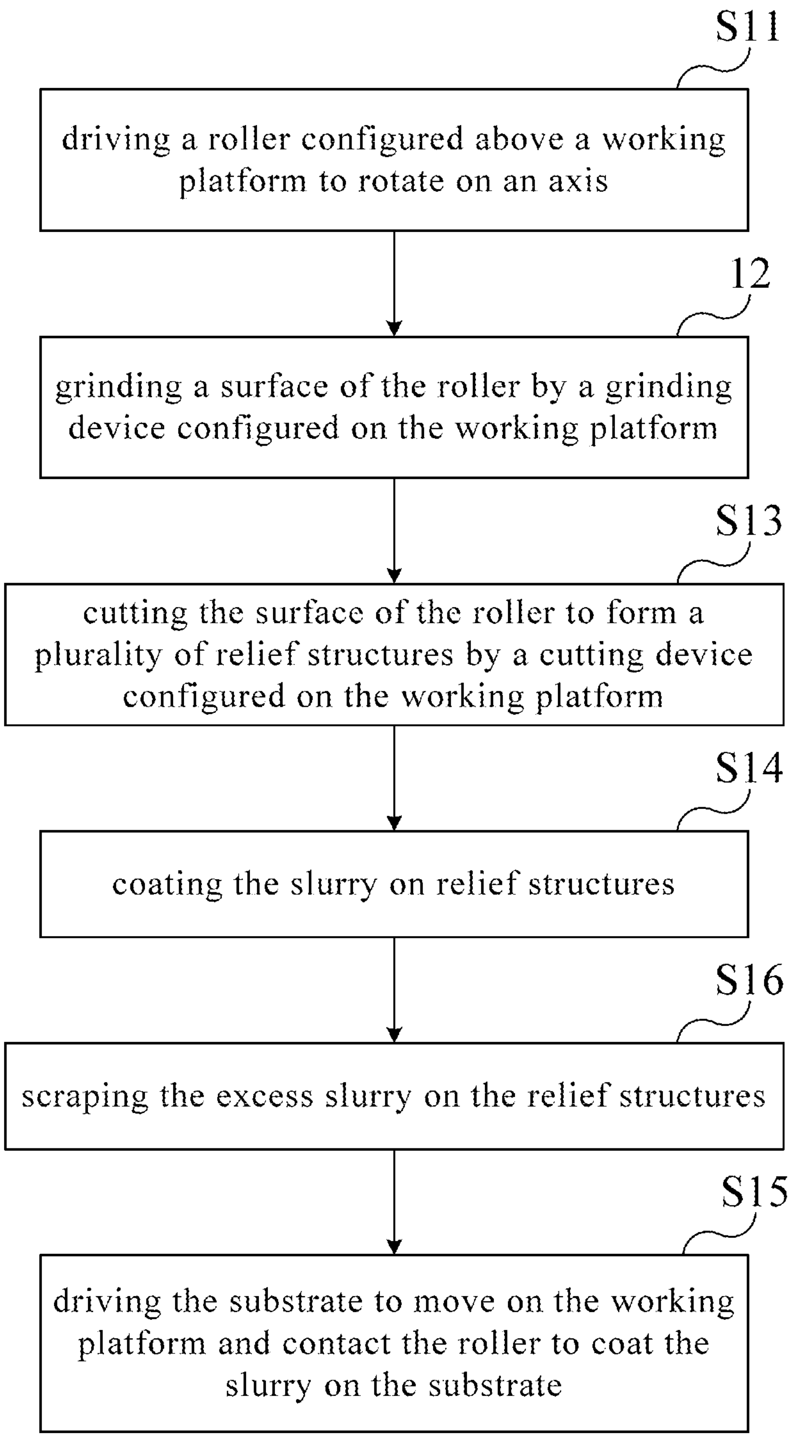
FIG. 9 is a step flow diagram illustrating the co-axial roller printing method in an embodiment of the present invention.

Please refer to FIG. 9. FIG. 9 is a step flow diagram illustrating a co-axial roller printing method in an embodiment of the present invention. The co-axial roller printing method in FIG. 9 can be achieved by the co-axial roller printing equipment 2 in FIG. 7A. As shown in FIG. 9, in this embodiment, the co-axial roller printing method further includes the following step of: step S16: a scraping plate 27 scrapes the excess slurry on the relief structures 224 by grooves 271.

In summary, the co-axial roller printing equipment of the present invention can directly process the roller by the grinding device and the cutting device configured on the same working platform, so that the roller can have good coaxial accuracy without disassembly, which not only increases the printing efficiency and accuracy, but also reduces the installation times. Furthermore, the roller of the co-axial roller printing equipment of the present invention can receive the slurry without disassembly and can directly print the slurry onto the substrate, which can not only effectively reduce the vibration and eccentricity of the roller due to the disassembly in the process, but also increase the printing efficiency and consistency. Moreover, the co-axial roller printing equipment of the present invention can also use a scraping plate to scrape off the diffused and excess slurry to control the size of the metal conductive wires, thereby increasing the printing accuracy and the printing efficiency.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A co-axial roller printing equipment for coating a slurry on a substrate, the co-axial roller printing equipment comprising:

a working platform configured to carry the substrate and drive the substrate to move;

a roller configured above the working platform, the roller having a surface and rotating on an axis;

a grinding device configured on the working platform and located on a first side of the roller, the grinding device being configured to contact and grind the surface of the roller;

a cutting device configured on the working platform and located on a second side of the roller, the cutting device being configured to cut the surface of the roller to form a plurality of relief structures; and a coating structure configured above the working platform and located on a third side of the roller, the coating structure comprising a plurality of holes corresponding to the relief structures, the coating structure being configured to receive the slurry and coat the slurry on the relief structures through the holes;

wherein, the grinding device grinds the surface of the roller and the cutting device cuts the surface of the roller in sequence; wherein, the coating structure coats the slurry on the relief structures, and then the roller prints the slurry on the substrate; wherein, the cutting process, the grinding process, the coating process and the printing process are performed without disassembly of the roller.

2. The co-axial roller printing equipment of claim 1, further comprising a scraping plate configured on a fourth side of the roller and contacting the surface of the roller, the scraping plate comprising a plurality of grooves corresponding to the relief structures respectively, and the scraping plate being configured to scrape the excess slurry on the relief structures by the grooves.

3. The co-axial roller printing equipment of claim 2, wherein the shape of the groove is one selected from square, rectangle, trapezoid and arc.

4. The co-axial roller printing equipment of claim 1, wherein the substrate has a substrate surface roughness, and the relief structures have a relief structure surface roughness, the substrate surface roughness is smaller than the relief structure surface roughness.

5. The co-axial roller printing equipment of claim 1, wherein the cutting device is configured to cut the surface of the roller to form a plurality of groove structures, and the relief structure is formed between each two groove structures.

6. The co-axial roller printing equipment of claim 1, further comprising a controller and the working platform comprising a shifting platform, the shifting platform being configured to carry the grinding device and the cutting device and connected to the controller, the controller being configured to control the shifting platform to drive the grinding device and the cutting device to grind and cut the surface of the roller.

7. The co-axial roller printing equipment of claim 1, wherein a gap is formed between the relief structures of the roller and the surface of the substrate.

* * * * *